United States Patent [19]

DuRocher

[11] 4,123,746
[45] Oct. 31, 1978

[54] THERMAL RELAY AND AUTOMOBILE CORNERING LAMP CONTROL UTILIZING THE SAME

[75] Inventor: Gideon A. DuRocher, Mt. Clemens, Mich.

[73] Assignee: Essex Group, Inc., Fort Wayne, Ind.

[21] Appl. No.: 799,424

[22] Filed: May 23, 1977

[51] Int. Cl.² .............................................. B60Q 1/26
[52] U.S. Cl. ................................. 340/81 R; 361/211; 340/74; 337/41
[58] Field of Search .................... 340/56, 73, 74, 75, 340/76, 81 R, 83, 331, 100; 337/41, 42, 44, 311, 337, 340; 361/164, 211

[56] References Cited

U.S. PATENT DOCUMENTS

| | | | |
|---|---|---|---|
| 2,285,677 | 6/1942 | Myers | 361/211 |
| 2,288,640 | 7/1942 | Paulus | 361/211 |
| 2,842,642 | 7/1958 | Colombo et al. | 361/211 X |
| 3,003,086 | 10/1961 | Strobel et al. | 361/211 |
| 3,312,398 | 4/1967 | Markham | 337/337 X |
| 3,405,380 | 10/1968 | Riebs | 337/41 |
| 3,462,733 | 8/1969 | Boya et al. | 340/81 X |
| 3,564,497 | 2/1971 | Gazzo | 340/75 |
| 4,024,497 | 5/1977 | Ruppel et al. | 340/74 |

Primary Examiner—Donald J. Yusko
Attorney, Agent, or Firm—Lawrence E. Freiburger; Robert D. Sommer

[57] ABSTRACT

A thermal relay having main contacts and normally closed auxiliary contacts, a thermally responsive actuator for sequentially operating the main and normally closed auxiliary contacts, and an electric heater for causing said thermally responsive actuator to move. The power supplied to the electric heater is controlled by the auxiliary contacts so that the position of the thermally responsive actuator in the operated position is self-regulated. Because the position of the thermally responsive actuator in the operated position is self-regulated, the time for deactuation of the relay is reduced from prior art relays. One use of the relay of the invention is that of a cornering relay in an automobile signal light system whereby the relay is actuated by the signal light flasher to actuate a cornering lamp.

12 Claims, 4 Drawing Figures

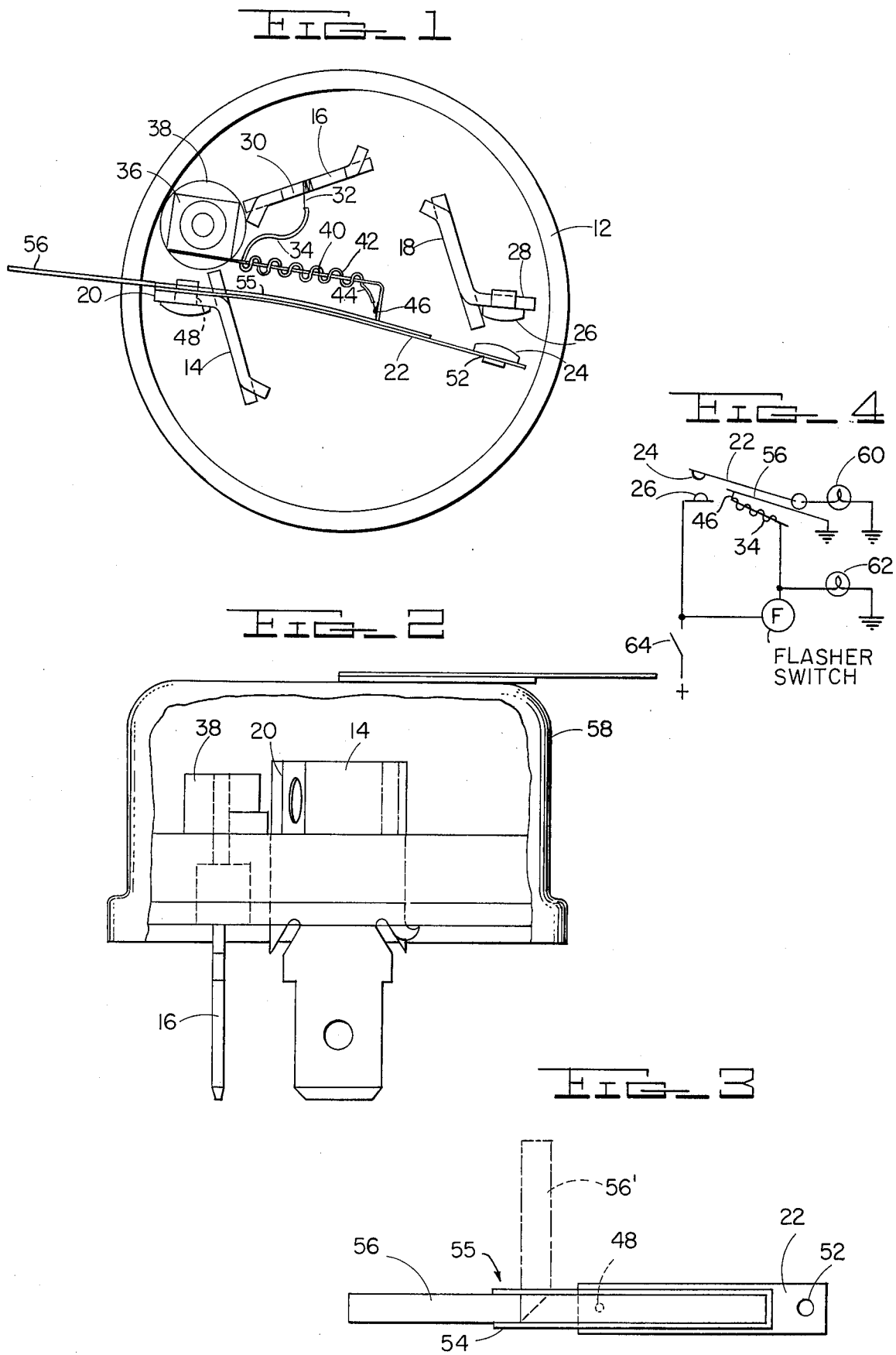

4,123,746

THERMAL RELAY AND AUTOMOBILE CORNERING LAMP CONTROL UTILIZING THE SAME

BACKGROUND OF THE INVENTION

Thermal relays have been well known for many years. Typical prior art thermal relays have included a bimetal actuator in close proximity to an electric heater which causes the bimetal actuator to bend and actuate one or more sets of electrical contacts when heated by the electric heater. The problem with prior art devices lies in the fact that heat is continuously supplied to the bimetal actuator. Thus, when it comes time to deenergize the prior art thermal relay, it is necessary for the bimetal actuator to cool before the relay contacts will be deactuated. Thus, a substantial amount of time is involved between the time current to the heater is interrupted and the time the thermal relay contacts are deenergized. This delay time in deenergizing and the delay time in energizing has severely restricted the use of thermal relays.

In the past few model years, automobiles have included a cornering lamp in the signal light system. The cornering lamps are placed on the side of the front fender of the automobile and are continuously energized when the turn signal switch is actuated by the driver. Generally, the cornering lamp is energized by a thermal relay which, in turn, is intermittently energized by the turn signal flasher. It is necessary, of course, that the cornering lamp be energized relatively soon after the turn signal switch is actuated, that it remain energized during the entire period of time the turn signal switch is closed, and that it be deenergized relatively soon after the turn signal switch is opened. Typical opening and closing times for the cornering relay are that the contacts close within 2.5 seconds after application of power and that after the contacts have remained closed for 30 seconds or more that they open within 7 seconds after power is interrupted. While the closing time has not provided any substantial problem, the opening time has been difficult to meet.

SUMMARY OF THE INVENTION

Accordingly, it is a broad object of the invention to provide a thermal relay which has reduced deactuation times. It is an additional object of the invention to provide a thermal relay suitable for use as a cornering relay which meets the aforementioned opening and closing times.

These objects as well as others which will become apparent as the description of the invention proceeds are accomplished by providing a thermal relay with normally closed auxiliary contacts which are sequentially actuated after the main contacts are actuated and which control the power supplied to the relay heater. The addition of the auxiliary contacts provides a self-regulating feature to the bimetal actuator whereby the bimetal alternately heats and cools as the auxiliary contacts are alternately opened and closed but the main contacts remain in the actuated position. Accordingly, when power to the thermal relay is interrupted, the bimetal actuator cools relatively quickly to deenergize the main contacts.

BRIEF DESCRIPTION OF THE DRAWINGS

During the course of the detailed description of the invention, reference will be made to the drawings in which:

FIG. 1 is an elevational view of a thermal relay in accordance with the invention showing the components of the relay mounted upon the base and with the cover removed;

FIG. 2 is a side elevational view of the relay assembly of FIG. 1 showing only the base, cover and electrical terminal;

FIG. 2 is an elevational view of the contact leaf and auxiliary contact laminate assembly of the invention; and FIG. 4 is a schematic drawing of the thermal relay of the invention and its use as a cornering relay.

DETAILED DESCRIPTION OF THE INVENTION

Referring now to the drawings, a thermal relay in accordance with the invention includes a base 12 constructed of insulating material and upon which the components of the assembly are mounted. Three substantially conventional electrical tab terminals 14, 16, 18 are mounted on the base. Terminal 14 provides an upstanding vertical tab 20 to which an elongated, resilient contact leaf 22 is riveted. The elongated contact leaf 22 carries a suitable electrical contact 24 on its end. A corresponding fixed electrical contact 26 is mounted on an upstanding tab 28 on electrical terminal 18 in such a manner that leaf will complete the circuit between terminals 14 and 18 whenever contacts 24 and 26 are allowed to close. The third terminal 16 includes an integral tab 30 around which the lead portion 32 of a heater wire 34 is wound to make an electrical connection between the terminal 16 and heater wire 34.

A thermally responsive actuator is preferably stamped and formed from flat bimetal stock and is mounted on the base 12 by riveting an integral horizontal mounting tab 36 to a boss 38 on the base. The thermally responsive actuator further includes a central elongated actuation portion 40 which is situated in a plane generally parallel to the plane defined by contact leaf 22 and which has a plurality of turns 42 of the heater wire 34 wound therearound. As was stated previously, the lead portion 32 of the heater wire 34 is electrically and mechanically attached to terminal 16. The other end portion 44 of heater wire 34 is electrically and mechanically attached, by welding or other suitable means, to the end portion 46 of the thermal actuator which abuts against an auxiliary contact as will hereinafter be described. It will be appreciated that the thermally responsive bimetal actuator normally biases the contact leaf 22 so that contacts 24 and 26 are not engaged, and when the bimetal actuator is heated it moves in a direction so as to allow the contacts 24 and 26 to close.

Referring now to FIG. 3, the contact leaf 22 has two apertures therein identified by reference numerals 48, and 52. Aperture 48 is adapted to receive a rivet to accomplish the mechanical and electrical attachment of the contact leaf to tab 20 of terminal 14. Aperture 52 similarly provides a mounting for electrical contact member 24. The aforementioned auxiliary electrical contact is formed by a laminated structure 55 comprising an insulative layer 54 and a conductive layer 56. The insulative layer 54 and conductive layer 56 are suitably bonded to one another and the insulative layer 54 is adhesively attached to the central portion of the contact leaf 22 so that conductive layer 56 is firmly affixed to contact leaf 22 but electrically insulated therefrom. However, it should be noted that the auxiliary contact laminate is not adhesively attached to the contact leaf 22 in the area of aperture 48 since it is necessary that conductor 56 be insulated from contact leaf 22. As shown in FIG. 3 the conductor 56 is longer than the insulator 54. During assembly, the conductor 56 is bent to the position indicated in dotted lines and by reference numeral 56'. When the assembly is completed, an electrically conductive cover 58 is crimped onto the base 12 and the conductor 56' is trapped therebetween so that conductor 56 is electrically connected to the housing.

The operation of the thermal relay of the invention will be described in connection with the schematic diagram of FIG. 4 which depicts the thermal relay of the invention in use as a cornering relay. The fixed contact 26 is connected to a positive voltage source via terminal 18. The contact blade 22 is connected to a cornering lamp 60 which in turn is connected to ground. The heater circuit of the relay includes the flasher switch F which is connected to the positive voltage supply and which controls the current supplied to a turn signal lamp 62 connected to ground. The flasher switch F also controls current flow to heater wire 34 through auxiliary contact 46 and conductor 56 to ground. In operation when the turn signal switch 64 is closed current will flow to the flasher F which will alternately open and close to cause turn signal lamp 62 to blink. At the same time, the flasher F will control current flow to heater wire 34 through the normally closed auxiliary contacts. Continued operation of the flasher will cause the heater to heat bimetal actuator which will warp and eventually allow contacts 24 and 26 to close to actuate cornering lamp 60. Continued operation of the flasher F will cause continued movement of the thermally responsive bimetal actuator so that the auxiliary contacts consisting of end portion 46 and conductor 56 will open. At this point the bimetal will cool and move in a direction to close the auxiliary contacts and again supply current to the heater. The auxiliary contacts will continue to cycle in this manner so that the position of the thermally responsive bimetal actuator in the actuated position is self-regulating. Eventually, when the turn signal switch 64 is opened, the bimetal will cool and move toward its normal position to open the circuit to the cornering lamp 60. It will be appreciated that with prior art relays where the self-regulating feature has not been provided, the time for opening of the main contacts 24, 26 will be considerably longer.

While the preferred embodiment of the invention has been disclosed, obvious modifications and alterations will occur to those skilled in the art. It is accordingly intended that the scope of the invention be defined in the claims.

What is claimed is:

1. An electrically actuated thermal switch, which comprises:
   main electrical contacts movable between a normal position and an operated position;
   means biasing said main electrical contacts to said operated position;
   an electrical heater;
   normally closed auxiliary electrical contacts controlling electrical power supplied to said electrical heater; and
   a thermally responsive actuator movable between actuated and deactuated positions, said thermally responsive actuator being situated in heat transfer relationship with said electrical heater and arranged to sequentially actuate said main electrical contacts from said normal position to said operated position and then open said normally closed auxiliary contacts when electrical current is initially supplied to said electrical heater, said thermally responsive actuator, electrical heater, main electrical contacts and auxiliary electrical contacts further being arranged to allow said auxiliary electrical contacts to cycle between closed and open positions after said main electrical contacts have initially been operated without moving said main electrical contacts from the operated position.

2. The electrically actuated thermal switch as claimed in claim 1 wherein said thermally responsive actuator comprises an elongated bimetal blade.

3. The electrically actuated thermal swtich as claimed in claim 2 wherein said main electrical contacts comprise a fixed contact and a movable contact.

4. The electrically actuated thermal switch as claimed in claim 3 wherein said auxiliary contacts comprise an electrical contact on said bimetal blade and an electrical contact insulated from but movable with said movable contact.

5. The thermal switch as claimed in claim 4 wherein said movable contact is mounted on a resilient, movable, flat, contact leaf and said second electrical contact comprises a flat electrical conductor on said contact leaf and a flat insulator interposed therebetween.

6. The thermal switch as claimed in claim 1 wherein said auxiliary contacts are connected in series relationship with said electrical heater.

7. In a turn signalling system for an automobile including a turn signal switch, a turn signal lamp, and a flasher switch intermittently energizing said turn signal lamp, a cornering lamp, and a cornering relay actuated by said flasher switch for controlling energization of said cornering lamp, an improved cornering relay, which comprises:
   main electrical contacts movable between a normal position and an operated position;
   means biasing said main electrical contacts to said operated position;
   an electrical heater;
   normally closed auxiliary electrical contacts controlling electrical power supplied to said electrical heater; and
   a thermally responsive actuator movable between actuated and deactuated positions, said thermally responsive actuator being situated in heat transfer relationship with said electrical heater, and arranged to sequentially actuate said main electrical contacts from said normal position to said operated position and then open said normally closed auxiliary contacts when electrical current is initially supplied to said electrical heater, said thermally responsive actuator, electrical heater, main electrical contacts and auxiliary electrical contacts further being arranged to allow said auxiliary electrical contacts to cycle between closed and open positions after said main electrical contacts have initially been operated without moving said main electrical contacts from the operated position.

8. The cornering relay as claimed in claim 7 wherein said thermally responsive actuator comprises an elongated bimetal blade.

9. The cornering relay as claimed in claim 8 wherein said main electrical contacts comprise a fixed contact and a movable contact.

10. The cornering relay as claimed in claim 9 wherein said auxiliary contacts comprise an electrical contact on said bimetal blade and a second electrical contact insulated from, but movable with, said movable contact.

11. The cornering relay as claimed in claim 10 wherein said movable contact is mounted on a resilient, movable, flat contact leaf and said second electrical contact comprises a flat electrical conductor on said contact leaf and a flat insulator interposed therebetween.

12. The cornering relay as claimed in claim 7 wherein said auxiliary contacts are connected in series relationship with said electrical heater.

* * * * *